United States Patent
Ferry et al.

Patent Number: 6,052,444
Date of Patent: *Apr. 18, 2000

[54] TELE-COMMUNICATION INFORMATION DISPLAY SYSTEM

[75] Inventors: Thomas Ferry; Jann Wilson, both of St. Louis, Mo.

[73] Assignee: SBC Technology Resources, Inc., Austin, Tex.

[*] Notice: This patent is subject to a terminal disclaimer.

[21] Appl. No.: 09/136,401

[22] Filed: Aug. 19, 1998

Related U.S. Application Data

[63] Continuation of application No. 07/911,471, Jul. 10, 1992, Pat. No. 5,805,677, which is a continuation-in-part of application No. 07/728,341, Jul. 11, 1991, abandoned.

[51] Int. Cl.⁷ .................................................. H04M 11/00
[52] U.S. Cl. ..................................... 379/93.35; 379/93.25; 379/142
[58] Field of Search .............................. 379/90.01, 93.01, 379/93.17, 93.18, 93.23, 93.35, 110.01, 127, 142, 161, 195, 194, 184, 201, 208, 215, 245, 247

[56] References Cited

U.S. PATENT DOCUMENTS

| | | |
|---|---|---|
| 3,934,079 | 1/1976 | Barnhart . |
| 4,338,492 | 7/1982 | Snopko . |

(List continued on next page.)

FOREIGN PATENT DOCUMENTS

| | | |
|---|---|---|
| 8603764 | 5/1988 | Brazil . |
| 2305078 | 10/1976 | France . |
| 2320670 | 3/1977 | France . |
| 1-78059 | 3/1989 | Japan . |
| 64-78059 | 3/1989 | Japan . |
| 1-91560 | 4/1989 | Japan . |
| 2113657 | 4/1990 | Japan . |
| 2202278 | 8/1990 | Japan . |
| 2229361 | 12/1990 | Japan . |
| 3-29456 | 2/1991 | Japan . |
| 2223911 | 4/1990 | United Kingdom . |

OTHER PUBLICATIONS

Advertising Brochure for the Class Mate Model 10, 1989.
Class Mate Systems Corporation Brochure, Mar. 1, 1990.
Mcgraw–Hill Electronics Dictionary, p. 356 (5th ed 1994) by John Markus & Neil Sclater.

(List continued on next page.)

*Primary Examiner*—Wing F. Chan
*Attorney, Agent, or Firm*—Greenblum & Bernstein, P.L.C.

[57] ABSTRACT

An apparatus and method are disclosed for transferring caller information or tele-communication information to a video device adapted to convert video format signals into a medium of expression. The caller information may include Calling Identity Delivery information. A detecting device detects the presence of a communication present on an incoming tele-communication line; a decoder device decodes the information present on the tele-communication line to produce caller information or tele-communication information related to the communication; and a transfer device causes the caller information or tele-communication information to be converted to the medium of expression by the video device. A frequency band capability conversion apparatus is also disclosed which accepts a composite signal and processes the composite signal so that it falls within the frequency band of a prescribed channel of a receiver. The frequency band capability conversion apparatus may be provided with a tele-communication line interface for interfacing a telephone line with the signal generator, recognizing an occurrence of a telephone call, and signalling information about the telephone call. The caller information or tele-communication information may comprise, e.g., caller ID information, voice messaging information, or caller ID or call waiting information.

4 Claims, 7 Drawing Sheets

U.S. PATENT DOCUMENTS

| | | |
|---|---|---|
| 4,349,701 | 9/1982 | Snopko . |
| 4,356,509 | 10/1982 | Skerlos et al. . |
| 4,405,946 | 9/1983 | Knight . |
| 4,456,925 | 6/1984 | Skerlos et al. . |
| 4,582,956 | 4/1986 | Doughty . |
| 4,805,205 | 2/1989 | Faye . |
| 4,805,210 | 2/1989 | Griffith, Jr. . |
| 4,852,151 | 7/1989 | Dittakavi et al. . |
| 4,873,719 | 10/1989 | Reese . |
| 4,922,523 | 5/1990 | Hashimoto . |
| 4,924,496 | 5/1990 | Figa et al. . |
| 4,974,085 | 11/1990 | Campbell et al. . |
| 4,989,081 | 1/1991 | Miyagawa et al. . |
| 4,995,074 | 2/1991 | Goldman et al. . |
| 5,029,199 | 7/1991 | Jones et al. . |
| 5,046,079 | 9/1991 | Hashimoto . |
| 5,046,093 | 9/1991 | Wachob . |
| 5,061,992 | 10/1991 | Ueno . |
| 5,073,927 | 12/1991 | Grube . |
| 5,083,205 | 1/1992 | Arai . |
| 5,099,331 | 3/1992 | Truong . |
| 5,109,279 | 4/1992 | Ando . |
| 5,117,452 | 5/1992 | Callele et al. . |
| 5,138,649 | 8/1992 | Krisbergh et al. . |
| 5,148,275 | 9/1992 | Blatter et al. . |
| 5,343,516 | 8/1994 | Callele et al. . |
| 5,805,677 | 9/1998 | Ferry et al. .......................... 379/93.35 |

OTHER PUBLICATIONS

Specification Description for MOS integrated circuit $\mu$PD6141.

J. Quain, "Why a Monitor Isn't a TV," PC Magazine, May 14, 1991, pp. 352–353.

Bellcore Publication TR–TSY–000031, "Class[SM]Feature, Calling Number Delivery" Issue 3, Jan. 1990.

Bellcore Technical Reference TR–NWT–000283, Issue 2, entitled "Simplified Message Desk Interface (SMDI) Generic Requirements" (May 1991).

Modification of Final Judgement issued by Judge Harold Greene in *U.S.A. v. Western ELectric Company et al.*, Civil Action No. 82–0192 in the United States District Court for the District of Columbia.

Consumer Information Appliance; p. 8; Published by Jupiter Communications; Oct. 1991.

D. WACHOB "Consumer–Friendly Cable/Telco Intergration: Today and Tomorrow," Communications Technology, Oct. 1991.

Class Hardware, Jupiter Communications Publication, Jan.–Feb. 1991, pp. 7–8.

Fig_ 4

TELE-COMMUNICATION INFORMATION DISPLAY SYSTEM

RELATED APPLICATION DATA

This application is a continuation application of U.S. patent application Ser. No. 07/911,471, entitled "Tele-Communication Information Display System", filed on Jul. 10, 1992 now patented U.S. Pat. No. 5,805,677, which is a continuation-in-part (CIP) application of U.S. patent application Ser. No. 07/728,341, filed on Jul. 11, 1991 now abandoned. The contents of U.S. patent application Ser. Nos. 07/911,471 and 07/728,341 are expressly incorporated herein by reference in their entireties.

FIELD OF THE INVENTION

The present invention relates to a method and apparatus for transferring caller information to a video device adapted to convert video format signals into a medium of expression. More particularly, the present invention is directed to a method and apparatus for indicating telephone caller identifying information and/or voice messaging information in association with a video device adapted to convert video format signals into a medium of expression. The video device may comprise, for example, a television set, whereby the caller identifying information and/or message waiting information is displayed on a screen of the television set. Further, the present invention provides a method and apparatus which are capable of displaying such information from a third party when a telephone is in use, thereby displaying, e.g., "call waiting" information on a video device.

DISCUSSION OF BACKGROUND AND MATERIAL INFORMATION

Calling name and number delivery, otherwise known as caller ID, is a service provided by local exchange carriers which allow called customer premises equipment (e.g., a telephone) to receive and indicate a calling party's directory number and the date and time of the call during the ringing cycle. Various products have been introduced to expand the application of the calling number delivery service (caller ID).

Existing products have been developed which display caller ID information on a personal computer screen. These products are designed to take advantage of the personal computer's inherent ability to receive digital information and display this information the personal computer's monitor. However, these existing products do not process caller ID information into a video format (such as NTSC) which is ready for display. Instead, these personal computer dependent products simply serve as format converters translating the caller ID information into ASCII format. The products then rely on the personal computer itself to generate the appropriate signals and timing information required for video display. Two particular products are MHE's Classmate 10 and Rochell Communications' Caller ID Plus.

MHE's Classmate 10 converts caller ID information into ASCII format for transmission via an RS232 port. The device passes ASCII information to personal computers, printers, or any device capable of receiving and processing ASCII information. The receiving device is then responsible for processing the ASCII information into the appropriate video/hard-copy display format. Rochell Communications' product, known as the Caller ID Plus, receives and processes caller ID information for input via an IBM compatible computer's serial interface port. This product utilizes the personal computer's internal circuitry to process the caller ID information into a signal for video display. The product also includes database software which permits users to associate caller ID information with other database files (e.g., customer account information).

Such personal computer-based caller ID products, in combination with compatible software packages, are intended to give the business personal computer users, e.g., direct access to their own account database files, triggered by receipt of incoming caller ID signal information. For the general "non-business" consumer, this application has highly limited appeal, and usefulness.

Japanese Patent Document 1-91560 discloses an incoming display system in a telephone set. A circuit is provided which detects an incoming telephone call, outputs a video signal band frequency, relating to the incoming telephone call, and sends the video signal band frequency to a television receiver. The television receiver blanks the television screen or displays characters, to indicate the presence of an incoming call on the telephone line. The system is used to inform people watching the television of the presence or arrival of an incoming call. The system disclosed by the Japanese patent document does not provide caller identifying information and/or voice messaging information on the screen of a television set, and also does not provide such information from a "call waiting" format, i.e., from a third party call when a telephone is already in use. Other known systems are capable of inputting telephone numbers to be called onto a television monitor via a remote control input system.

SUMMARY OF THE INVENTION

In view of the above, one object of the present invention is to provide an apparatus and method which process caller information (such as caller ID and/or voice messaging and/or call waiting information) and to translate the caller information (both second and third party) into a video format (such as NTSC) ready for display. Additionally, it is an object of the present invention to display the caller information on a video monitor or television screen.

It is a further object of the present invention to provide an apparatus or method which generates video signals indicating the presence of a voice mail message at a local switch, i.e., a stored program control system (SPCS), of a telephone system.

It is a further object of the present invention to provide a frequency band capability conversion apparatus which accepts a composite signal and processes the composite signal so that it falls within a frequency band of a prescribed channel of a receiver. In this regard, it is an object of the present invention to provide the frequency band capability conversion apparatus with information relating to a communication, such as caller identifying information, being transferred through a tele-communication line interface.

It is a further object of the present invention to provide a cable-ready converter for accepting a video composite signal and processing the video composite signal so that it falls within a prescribed frequency band of a television. In this regard, it is an object of the present invention to provide the cable-ready converter with a device for causing caller identifying information to be displayed on a television screen.

It is a further object of the present invention to provide an apparatus or method which may support mass market consumers of caller ID and/or voice messaging services, by providing a visual display of information over a familiar and widely dispersed medium, such as the end-user's existing television set. It is thus an object of the present invention to both provide a convenient way for the end-user to receive caller ID and/or voice messaging information and to also provide an alternative to traditional telephone and/or computer-based methods of displaying this information. An object of the present invention is to deliver such information in an unobtrusive fashion, allowing the television viewer to continue watching uninterrupted video programming while at the same time seeing the incoming caller ID, call waiting, or voice messaging information. Existing products do not provide such convenience and versatility to the end-user.

In view of the present commercial needs, it is an object of the present invention to provide a separate transfer device which may be connected to a video device such as a television to allow indication of caller ID and/or message waiting information. The transfer device may, however, be incorporated within a video device such as a television set, monitor, VCR, or cable box.

The present invention, therefore, is directed to an apparatus and method for transferring caller information to a video device adapted to convert video format signals into a medium of expression. In accordance with a particular aspect of the apparatus of the present invention, a detecting device is provided for detecting the presence of a communication present on an incoming tele-communication line, and a decoder device is provided for decoding information present on a tele-communication line to produce caller information related to the communication. A transfer device causes the caller information to be converted to a medium of expression by the video device.

In accordance with a particular aspect of the present invention, the apparatus is provided with a device for indicating caller information in association with the video device. The caller information may comprise caller identifying information concerning the origin of a communication being detected by the detecting device (e.g., a telephone call from another party).

In a particular aspect of the present invention, the indicating device comprises a display device for causing the caller information to be displayed on a screen of a television. In accordance with another aspect of the invention, the caller identifying information comprises a telephone number of a telephone from which the communication is originating. In another aspect of the invention, the caller information comprises a message waiting indication.

The apparatus of the present invention may be used with a video device which comprises a video signal input and displays video signals, which are connected to the video signal input, onto a screen. In this regard, the apparatus may further comprise a combining device for combining the caller information with video signals connected to the video signal input while the video signals are being displayed by the video device onto the screen. The video device may itself comprise a television.

In a further aspect of the present invention, the caller information comprises a caller signal, and the apparatus is further provided with a synchronizing device for synchronizing the caller signal with a video signal to form a synchronized caller signal. A first combining device is provided having a device for combining the synchronized caller signal with the video signal to form a composite video signal. In this regard, the synchronizing device may comprise a device for producing a synchronization signal, and the apparatus may further comprise a second combining device for combining the synchronization signal with the composite video signal. Moreover, the apparatus may further comprise a separator device for separating video, audio and synchronization signals from an incoming composite video signal.

In accordance with a further aspect of the present invention, the synchronizing device may be further provided with a device for outputting a plurality of synchronization signals to respectively control each of the decoding device and the second combining device. The separator device may comprise a device for demodulating the incoming composite video signal, and the second combining device may comprise a device for modulating the video, audio and synchronization signals. In this regard the modulating device comprises a device for modulating the video, audio, and synchronization signals to form a complete composite signal. The complete composite video signal may, for example, comprise an NTSC signal.

In accordance with a particular aspect of the invention the apparatus is combined with a television receiver, VCR, or cable ready converter.

The decoding device may comprise a message waiting detector for detecting a message waiting condition which may comprise, e.g., a stuttering voltage present on the tele-communication line, and the decoding device may also comprise a character generator for converting a coded signal to a video format signal representing characters.

In yet a further aspect of the present invention, means are provided for automatically causing the caller information to be displayed on the screen without substantial interruption of any video information already being displayed on the screen before detection of the presence of the communication by the detecting device.

The apparatus may further include a device for establishing a communication path between a caller and a receiver, wherein the detecting device comprises a device for detecting the presence of a communication request present on the incoming tele-communication line which is originating from a third source separate from the caller and receiver. The caller information includes information relating to the origin of the third source. The communication path may comprise a telephone call which is established between a caller and a receiver, and the communication request may comprise, for example, a device for signalling that a third source is requesting that an additional communication path be established.

The caller information may include a telephone number of a telephone which comprises the third source, and the video device may include a television.

In accordance with a further aspect of the invention, the apparatus further includes a device for temporarily disconnecting the tele-communication line from the receiver, a device for simulating an off-hook condition on the tele-communication line, and a device for receiving the caller information from the tele-communication line. In addition, a determining device may be provided for determining whether additional phones are connected to the tele-communication line in an off-hook condition, and a controlling device may be provided for controlling the simulating device and the receiving device to be operative only when the determining device determines that no additional phones are connected to the tele-communication line in an off-hook condition.

In accordance with a further aspect of the invention, the disconnecting device comprises a relay having both a normal position, in which the relay maintains a connection between the caller and the receiver, and a reconfigured position, in which the relay has reconfigured the connection between the tele-communication line and the receiver. In addition, a simulating load is provided, connected to the tele-communication line when the relay is in the reconfigured position, for simulating an off-hook condition of the receiver. The simulating load may comprise, for example, a transformer having a first and a second winding, the first winding being connected to the tele-communication line, and the second winding being connected to a resistive load. The relay may comprise, for example, a mechanism responsive to electrical power for switching the relay to the reconfigured position, whereby the relay remains in the normal position in the absence of electrical power.

In another aspect of the present invention, a method is provided for transferring caller information to a video device adapted to convert video format signals into a medium of expression. The presence of a communication present on an incoming tele-communication line is detected, and information present on the tele-communication line is decoded to produce caller information related to the communication. Thereafter, the caller information is caused to be converted to the medium of expression in association with the video device.

In a particular aspect of the present invention, the method further comprises a step of causing the caller identification information to be displayed on a screen of a television. The caller information may comprise caller identifying information, which may concern the origin of a communication being detected at the step of detecting. The communication may comprise a telephone call from another party, or a stuttering voltage condition (or other signal condition) present on the telephone line which indicates the presence of a message waiting. In addition, the caller identifying information may comprise a telephone number of a telephone from which the communication is originating.

In accordance with another aspect of the present invention, the method is used with a video device which comprises a video signal input and displays video signals, which are connected to the video signal input, on a screen. The caller information is combined with video signals connected to the video signal input while the video signals are being displayed by the video device on the screen. The video device may comprise a television.

In accordance with another aspect of the present invention, the caller information comprises a caller signal, and the caller signal is synchronized with a video signal to form a synchronized caller signal. The synchronized signal is then combined with the video signal to form a composite video signal. In this regard, the method may further comprise steps of producing a synchronization signal and, in a second step of combining, combining the synchronization signal with the composite video signal. Moreover, the method may comprise a step of separating video, audio, and synchronization signals from an incoming composite video signal. The incoming composite video signal may comprise a signal present at a video signal input of the video device. In this regard, the step of separating may comprise a step of demodulating the incoming composite video signal, and the second step of combining may comprise an additional step of modulating the video, audio, and synchronization signals.

In accordance with another aspect of the present invention, the method further comprises a step of outputting a plurality of synchronization signals to be used as guidance in the execution of the step of decoding and the second step of combining.

In accordance with an additional aspect of the present invention, the step of modulating comprises a step of modulating the video, audio, and synchronization signals to form a complete composite video signal. In this regard, the complete composite video signal may comprise an NTSC signal.

In accordance with a further aspect of the present invention, the method further includes establishing a communication path between a caller and a receiver, wherein the detecting step comprises detecting the presence of a communication request present on the incoming telephone line which is originating from a third source separate from the caller and receiver. The caller information may comprise information relating to the origin of the third source. The communication path may, for example, comprise a telephone call between the caller and receiver, and the communication request may comprise a signal that a third source is requesting that an additional communication path be established. The caller information may include a telephone number of a telephone which comprises the third source, and the video device may include a television.

In accordance with a further aspect of the present invention, the method also includes the steps of temporarily disconnecting the telephone line from the receiver, simulating an off-hook condition on the telephone line, and receiving the caller information from the telephone line. Moreover, additional steps may be provided, such as determining whether additional phones are connected to the telephone line in an off-hook condition, and controlling the simulating and receiving steps to be executed only when it is determined that no additional phones are connected to the telephone line in an off-hook condition.

In accordance with a further aspect of the present invention, the disconnecting step includes a step of operating a relay having both a normal position, in which the relay maintains a connection between the caller and the receiver, and a reconfigured position, in which the relay has reconfigured the connection between the tele-communication line and the receiver, wherein the operating step includes switching the relay into the reconfigure position. In addition, a step of simulating an off-hook condition may be provided, wherein an off-hook condition of the receiver is simulated by connecting a simulating mode to the telephone line when the relay is in the reconfigure position. An additional step may be provided of supplying electrical power to the relay to switch the relay to the reconfigure position, and eliminating the electrical power to keep the relay in the normal position.

In accordance with yet another aspect of the present invention, an apparatus is provided for indicating tele-communication information in association with a device adapted to convert video format signals into a medium of expression. A device is provided for converting the tele-communication information into a tele-communication information signal, and a device is provided for synchronizing the tele-communication information signal with a video signal to form a synchronized tele-communication signal. A combining device then combines the synchronized tele-communication signal with the video signal to form a composite video signal.

In yet a further aspect of the present invention, the synchronization device comprises a device for producing a synchronization signal, and a second combining device (which may have a device for modulating video, audio, and synchronization signals) which combines the synchronization signal with the composite video signal. A further device may be provided for detecting the presence of the tele-communication information signal and, when a tele-communication signal is detected, activating the apparatus.

The tele-communication information may comprise information regarding the identification of a caller on a telephone line. The synchronizing device may comprise a device for outputting a plurality of synchronization signals to respectively control each of the converting device and the second combining device.

In yet a further aspect of the present invention, a separator device separates video, audio and synchronization signals from an incoming composite video signal. The incoming composite video signal may comprise an NTSC (National Television Standards Committee) signal.

The separator device may comprise a device for demodulating the incoming composite video signal, and the second combining device may have a device for modulating the video, audio, and synchronization signals separated by the separator device. In this regard, the modulating device comprises a device for modulating the video, audio and synchronization signals to form a complete video composite signal. The complete video composite signal may comprise an NTSC signal.

In accordance with another aspect of the present invention, a method is provided for indicating tele-communication information on a device adapted to convert video signals into a medium of expression. Tele-communication information is converted into a tele-communication information signal, and the tele-communication information signal is synchronized with a video signal to form a synchronized signal. The synchronized signal and the video signal are combined to form a composite video signal. The composite video signal may be sent to one or more compatible devices.

In accordance with a particular aspect, the step of synchronizing further comprises a step of producing a synchronization signal. In a second step of combining, the synchronization signal is combined with the composite video signal. The tele-communication information may comprise telephone information, such as information regarding the identification of a caller.

In another further aspect of the method, video, audio and synchronization signals are separated from an incoming composite video signal, wherein the incoming composite video signal may comprise an NTSC signal. In accordance with another aspect of the present invention, the method further comprises a step of outputting a plurality of synchronization signals to respectfully control each of the steps of converting and combining. In accordance with a particular aspect, the incoming composite video signal is demodulated, and the second step of combining comprises a step of modulating the video, audio, and synchronization signals which are separated at the separating step. In this regard, the step of modulating comprises a step of modulating the video, audio, and synchronization signals to form a complete video composite signal, wherein the complete composite signal may comprise an NTSC signal.

In a further aspect of the present invention, a frequency band capability conversion apparatus is provided for accepting a composite signal and processing the composite signal so that it falls within the frequency band of a prescribed channel of a receiver. A filter device is provided having a plurality of filters. Each of the filters extract portions of the signal which fall within a prescribed frequency band. The filter device also has a device for selecting one of the plurality of filters. When one of the plurality of filters is selected, a composite signal falling within a desired frequency band is selected. A device is provided for demodulating the composite signal to produce a demodulated signal, and a further device processes the demodulated signal to produce a processed signal. Another device modulates the information of the processed signal so that it falls within a frequency band corresponding to a prescribed channel of the receiver. The apparatus is further provided with a tele-communication line interface, and a signal generating device, coupled between the tele-communication line interface and the processing device, for generating a signal. In a particular aspect of the present invention, the tele-communication interface comprises a device for interfacing a telephone line with the signal generating device, a device for recognizing an occurrence of a telephone call, and a device for signalling information about the telephone call to the signal generating device.

In accordance with another aspect of the apparatus of the present invention, the signal generator is provided with a device for converting the information about the telephone call into a video signal representing characters. In this regard, a code detection device may be provided to detect the presence of a status code present on the telephone line, and in response to such detection, signal the occurrence of the status code to the signal generating device. The status code may comprise a signal indicating that a message is waiting or a signal indicating a ringing condition representing that someone is calling on the telephone line.

In a further aspect of the apparatus of the present invention, the tuner device comprises a device for providing remote control of the selecting device and a device for providing manual control of the selecting device. Both of the remote control device and the manual control device comprise a device for selectively switching between the plurality of filters. The prescribed channel may be channel 3 or 4 of a standard NTSC television set.

In accordance with another aspect of the present invention, a cable-ready converter is provided for accepting a composite video signal and processing the composite video signal so that it falls within the frequency band of a prescribed VHF channel of a television. A tuner device is provided having a plurality of filters. Each of the filters extract portions of the signal which fall within a prescribed frequency band. The tuner device also comprises a device for selecting one of the plurality of filters. When one of the plurality of filters is selected, a composite video signal falling within a desired frequency band is selected. A demodulator device demodulates the video composite signal to produce a demodulator signal. A video processing device processes the demodulator signal to produce a processed signal, and a modulator device translates the information of the processed signal so that it falls within a frequency band corresponding to a VHF television channel. The apparatus is further provided with a telephone interface device and a character generator which is coupled between the telephone interface device and the processing device.

In accordance with another aspect of the present invention, an interface is provided for interfacing a telephone line with the character generator. In association with the interface, a device recognizes an occurrence of a telephone call, and another device signals information about the telephone call to the character generator. In this regard, the character generator may comprise a device for converting the information about the telephone call into a video signal.

In accordance with a further aspect of the present invention, a code detection device detects the presence of a status code present on the telephone line, and in response to such detection, signals the occurrence of the status code to the character generator. The tuner device may comprise a remote control device and a manual control device. Both the remote control device and the manual control device are capable of selectively switching between the plurality of filters.

In accordance with another aspect of the present invention, the prescribed VHF channel comprises channel 3 or 4 of a standard NTSC television.

The above-listed and other objects, features, and advantages of the present invention will be more fully set forth hereinafter.

BRIEF DESCRIPTION OF THE DRAWINGS

The present invention is further described in the detailed description which follows, by reference to the following plurality of drawings representing non-limiting examples of preferred embodiments of the present invention, similar reference numerals representing similar parts throughout several views of the drawings, wherein.

DETAILED DESCRIPTION OF THE PREFERRED EMBODIMENTS

Figure 1:
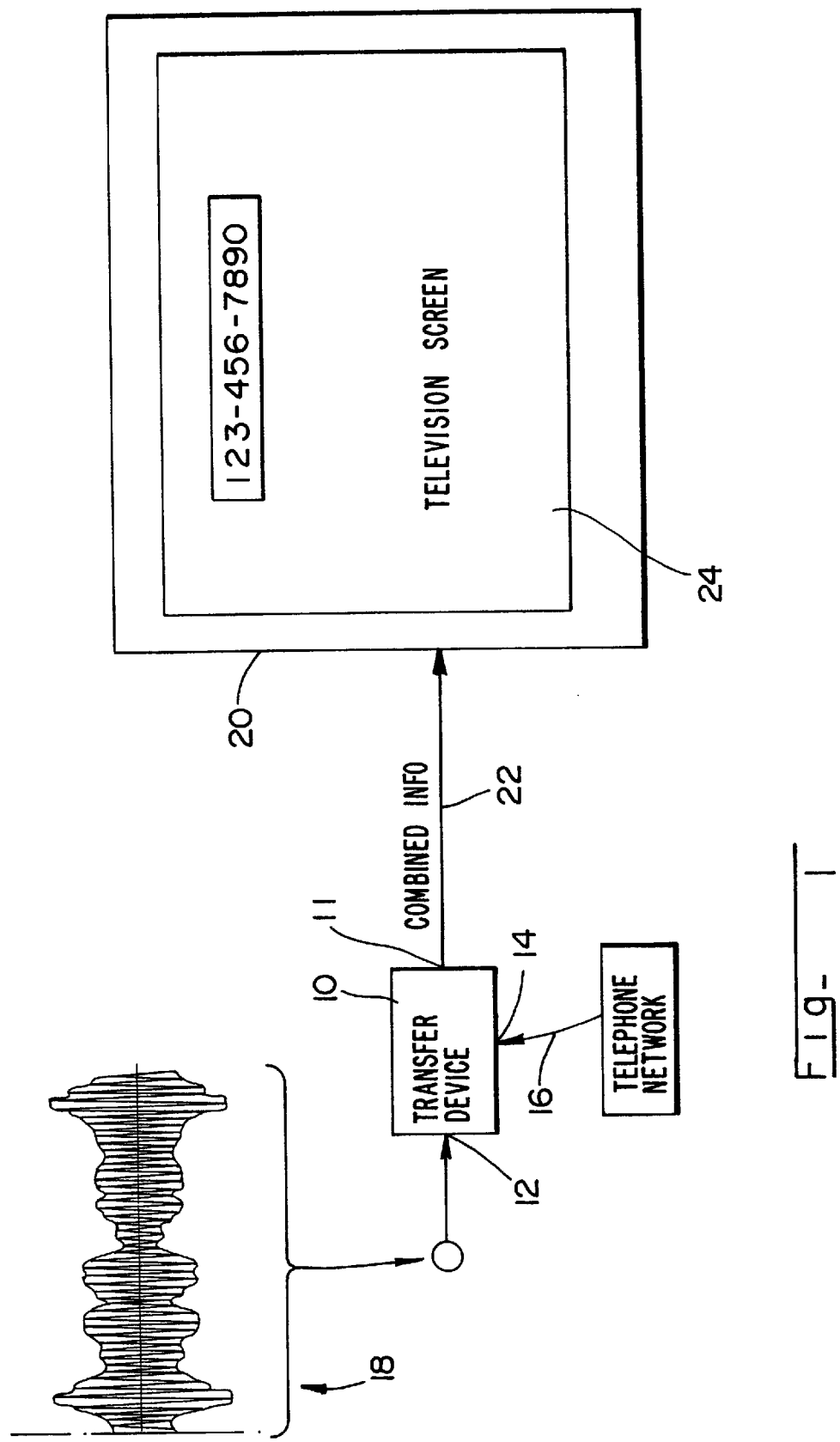
FIG. 1 illustrates a transfer device of the present invention connected to a television set, whereby caller information such as a telephone number of a calling party is displayed on a screen of the television set.

Referring now to the drawings in greater detail, FIG. 1 shows a transfer device 10, in accordance with the present invention, connected to a television 20 via coaxial cable 22. Transfer device 10 comprises a composite video input 12 and a telephone line input terminal 14. A signal source 18, originating from, for example, a cable TV connection, a VCR recorder, a TV antenna, or a satellite, is connected to composite video input terminal 12, and a telephone line 16 is connected to telephone line input terminal 14 of transfer device 10. In the embodiments disclosed herein, signal source 18 comprises a composite video signal transmitted on an RF carrier.

In accordance with the particular embodiment shown in FIG. 1, by way of example, transfer device 10 detects the presence of caller ID information passed by a telephone network through telephone line 16, and combines the caller ID information with a TV NTSC signal received at input terminal 12, thus placing the caller ID information on a television screen 24. In the example shown in FIG. 1, the caller ID information is displayed across the top of the screen in text form. Alternately, the caller ID information may be placed on the screen of a TV using picture-in-picture technology, by using commercially available hardware.

As shown in FIG. 1, the phone directory number of a telephone, from which a communication present on the telephone line originates, is displayed on television screen 24. In the alternative, or in addition, other information concerning the caller's identification (e.g., name or ID number) and/or the origin (e.g., the location or company name) of the telephone call present on the telephone line may also be displayed on television screen 24 by simply displaying characters or using picture-in-picture technology. Although reference herein may be made to ID numbers or names, the present invention is generally equally applicable to both, and reference to one will not preclude reference to the other. In this regard, a microprocessor and memory may be provided by which a user may store digital video images (from a camcorder, for example), for, e.g., representing parties who frequently call the user. Such images may be arranged in the form of a look-up table in the memory alongside their corresponding telephone numbers. Thus, upon detection of specific caller identifying information (which usually includes a code representing the telephone number of the calling party) being present on telephone line 16, transfer device 10, having a microprocessor and memory, may compare the caller identifying information (i.e., the telephone number of the calling party) to the video images stored in the memory. Accordingly, once the video image corresponding to the detected telephone number is located, the corresponding video image may be displayed alone or in conjunction with the telephone number of the calling party on screen 24.

Figure 3:
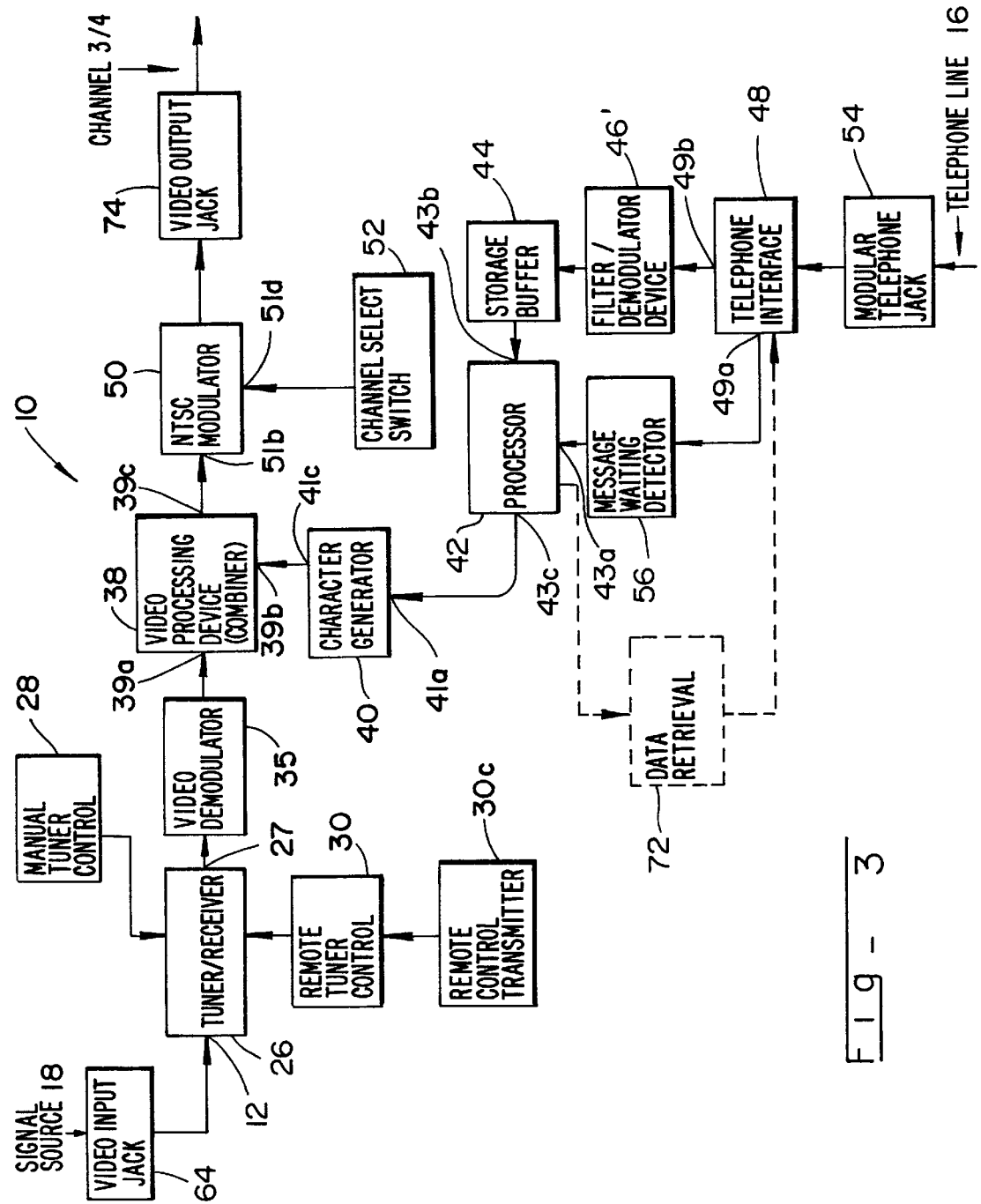
FIG. 3 illustrates another embodiment of the transfer device of the present invention, wherein means are provided which allow an indication of voice messaging information, received via the telephone line, onto a video screen.

Additionally, the transfer device of the present invention may be provided with a look-up table and/or data retrieval system 72, as indicated by the dashed line in FIG. 3, used in conjunction with the aforementioned memory and microprocessor. The look-up table and/or data retrieval system 72 may be configured to activate one of a plurality of preset messages to be transmitted to telephone line 16 upon use of a switch actuated by a user while watching the television. Thus, once a caller's identification is displayed on screen 24, the television viewer may send a certain message to the party who is calling by simply pressing a button or message code. In other words, upon realizing that a certain party is calling, after display of the caller's ID on the television screen, the television viewer/user may send the caller a specific message. A list of preset messages may be stored in the memory which may be accessed by the microprocessor.

In accordance with the particular embodiment shown in FIG. 1, the transfer device 10 receives and decodes caller ID and/or voice messaging information via telephone line 16, and receives and demodulates an NTSC video signal 18 (e.g., from a cable service, TV antenna, or other NTSC compatible device) via composite video input terminal 12. Transfer device 10 then decodes the caller ID and/or voice messaging information, demodulates the NTSC video signal to form a demodulated video signal, and combines the decoded caller ID and/or voice messaging information with the demodulated video signal. Thereafter, transfer device 10 remodulates and amplifies the demodulated video signal to form a final composite video signal at a standard NTSC television carrier frequency or channel. Transfer device 10 outputs a final composite video signal via output terminal 11, which may be connected to any NTSC video signal compatible device, such as a television set, television monitor, VCR, cable box, and so on. While transfer device 10 as illustrated is a separate device, it could equally well be incorporated within, e.g., a television set, monitor, VCR, or cable box.

A significant feature of the transfer device of the present invention is that caller information or tele-communication information in conjunction with the transfer device of the present invention may be displayed on a standard television screen without interfering with a program currently being viewed by the user. Additionally, or in the alternative, transfer device 10 may decode signalling information provided by local exchange carriers (telephone companies) which would indicate the storage of voice, image or video messages at some remote location that has been placed there for the called party to retrieve at his or her convenience. This function is typically referred to as a "message waiting" indicator.

Figure 2:
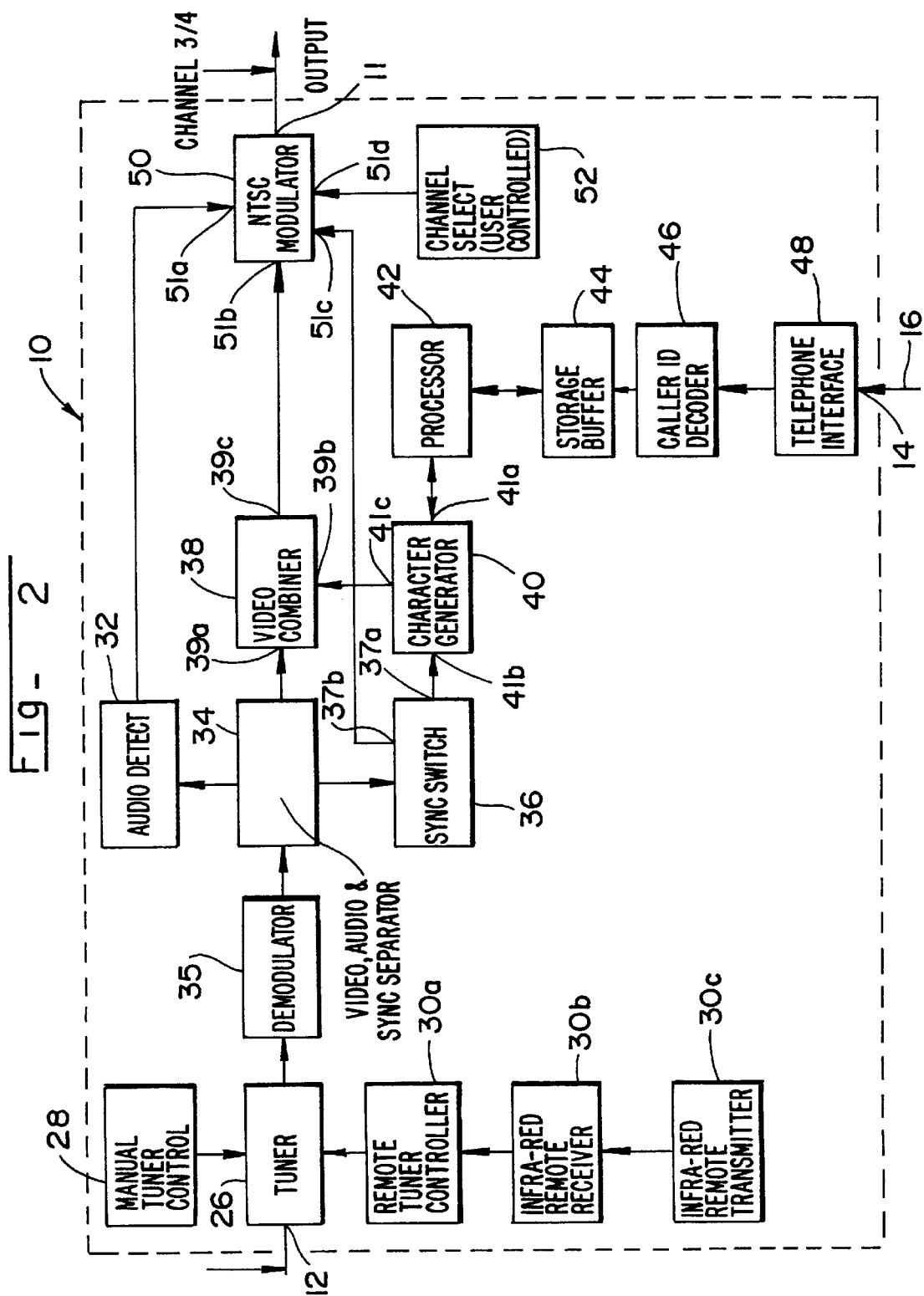
FIG. 2 illustrates a block diagram representing various components of one embodiment of the transfer device of the present invention.

FIG. 2 illustrates, in more detail, a particular embodiment of the transfer device of the present invention. Referring to FIG. 2, transfer device 10 interfaces with a public switched telephone network via telephone line 16. Interface 48, which comprises ring detect circuitry, is connected to caller ID decoder 46. The output of caller ID decoder 46 is connected to a storage buffer 44, which is in turn connected to a processor 42. Processor 42 is, in turn, connected to character generator 40.

Composite video input terminal 12 comprises an input terminal of tuner 26, the output of which is connected to the input of a demodulator 35. The output of demodulator 35 is connected to the input terminal of a video/audio/sync separator 34. Each of three outputs of separator 34 is respectively connected to audio detect device 32, video combiner 38, and sync switch 36. Sync switch 36 comprises two output terminals, 37a, 37b, each of which is respectively connected to sync input 41b of character generator 40 and sync input 51c of NTSC modulator 50.

Video format output 41c of character generator 40 is connected to video combiner 38. Output terminal 39c of video combiner 38 is connected to an input terminal 51b of NTSC modulator 50. Outputs of audio detect device 32, video combiner 38, and sync switch 36 are each respectively connected to input terminals 51a, 51b, and 51c of NTSC modulator 50. Carrier or channel select switch 52 is connected to a channel select input 51d of NTSC modulator 50. NTSC modulator 50 comprises a transfer device output terminal 11.

A remote tuner controller 30a, infrared or similar receiver 30b and transmitter 30c (e.g., an infrared remote transmitter) are connected in tandem to tuner 26. In addition, manual tuner control 28 is connected to tuner 26.

In operation, ring detect circuitry provided within interface 48 determines the presence of an initial ring signal on telephone line 16. This information is detected by caller ID decoder 46, which prepares to receive and decode the caller ID information on telephone line 16. Caller ID decoder 46 receives this information (which is sent on telephone line 16 between the first and second rings), decodes the information, and places the information in storage buffer 44, where the information may be accessed by processor 42.

Processor 42 accesses the caller ID information stored in buffer 44, and provides it to character generator 40, which may comprise video display circuitry in the form of either PIP or overlay video display integrated circuits (ICs), in the appropriate video format. Video display ICs will generate the appropriate video information (e.g., such as characters) in video format and provide this information, along with sync pulse information, in conjunction with sync pulse information received by character generator 40 at its sync input 41b.

A composite video signal source 18 is received at transfer device input 12 via tuner 26 and demodulator 35, and is passed to separator 34, which splits the composite video signal into its constituent parts for processing. In this regard, separator device 34 separates out audio, video, and sync signals from the demodulated composite video input signal. The separated video components of the demodulated composite video signal are input to video combiner 38, where they are combined with video formatted caller ID information, which is present at character input terminal 39b. A sync pulse, also separated out by separator circuit 34, is routed to sync switch 36 which, in conjunction with the sync signal which is input thereto, outputs two respective sync signals (or pulse signals) via output terminals 37a and 37b, which are respectively routed to sync inputs 41b and 51c of character generator 40 and NTSC modulator 50. Accordingly, video format caller ID information, output by character generator 40 at terminal 41c, is synchronized with input composite video signal source 18 which is input at transfer device input 12.

Audio detect circuitry 32 captures the audio signal components of the input composite video signal 18 for inclusion in the final composite video signal to be output by the transfer device at output 11.

Each of the constituent parts, output respectively from audio detecting circuitry 32, video combiner 38, and sync switch 36, are routed to NTSC modulator circuitry 50 where a final composite video signal is generated and processed for transmission to a compatible video device via transfer device output 11. NTSC modulator circuitry modulates the signals input thereto to thereby translate the information into proper NTSC format, and moves the signals in the frequency domain by means of a carrier signal to a standard VHF channel, e.g., either of channels 3 or 4. The frequency band to which the final composite video signal is moved is centered around the frequency of the carrier signal which is selected by carrier or channel select switch 52. Channel select switch 52 may be configured to choose, e.g., between carrier signal frequencies corresponding to either channel 3 or 4 of a standard VHF television channel.

Once NTSC modulator circuitry 50 recombines and modulates the audio signal, video signal, and sync signal, a final composite video signal is formed in proper NTSC format. Thus, once a television is connected to transfer device output 11, the final composite video signal, which contains video and audio information from composite video signal source 18, along with any caller ID or other information generated by character generator 40, will be displayed on the television screen. Alternately, if another NTSC video compatible device such as a video recorder is connected to output 11 of transfer device 10, the final composite video signal input thereto will comprise the necessary information to cause such a concurrent or simultaneous display of the video, audio and caller ID information, should the final composite video signal be played back at any future time by the use of a monitor or television.

FIG. 3 partially illustrates another embodiment of the transfer device of the present invention, wherein a message waiting detector 56 is provided which allows the transfer device to indicate the presence of message waiting information on telephone line 16. In other words, the transfer device shown in FIG. 3, in addition to providing caller ID information to a video format device, also decodes signalling information provided on telephone line 16 which would indicate the storage of voice, image, or video information at some remote location, whereby the information has been placed there for the called party to retrieve. In FIG. 3, similar elements as those shown in FIG. 2 are depicted by the similar reference numerals.

In the transfer device shown in FIG. 3, for purposes of simplification, only the video portions of the system are shown. Thus, referring to the drawing of FIG. 3, separator 34 is not shown. Rather, video demodulator means 35 is shown connected to video processing device (video combiner) 38, the output of which is connected to NTSC modulator 50. Signal source 18 is connected to a video input jack 64 which is connected to composite video input terminal 12 of transfer device 10. A remote control tuner device 30 (which comprises controller 30a and receiver 30b; see FIG. 2) and remote control transmitter 30c are coupled to tuner 26. In addition, manual tuner control 28 is connected to another input terminal of tuner 26. Output 27 of tuner 26 is connected to the input of video demodulator 35.

Transfer device 10 is connected to a Public Switched Telephone Network via a standard modular telephone jack 54. Jack 54 is then connected to telephone interface 48, which comprises two outputs 49a and 49b. Interface output 49a is connected to message waiting detector 56, which has an output connected to input 43a of a processor 42. Interface output 49b is connected to a filter/demodulator device 46', which has an output connected to an input of a storage buffer 44. Storage buffer 44 is in turn connected to an input 43b of processor 42. The output 43c of processor 42 is connected to an input 41a of character generator 40. Output 41c of character generator device 40 is connected to a second input 39b of video processor (combiner) 38. Video outputjack 74 is connected to output 11 of transfer device 10.

In operation, in order to process caller ID information, telephone interface 48 detects the presence of a standard telephone line ringing signal as defined in Bell System Voice Communications Technical Reference PUB 48005, January, 1980, the disclosure of which is expressly incorporated by reference herein in its entirety. In response to a detection of a first ring, telephone interface 48 sends a signal to filter/demodulator device 46' alerting device 46' to prepare for reception of caller ID data on telephone line 16. Information concerning the calling number, type of call, and other signalling information is passed to the customer via telephone line 16 (for both the embodiments and FIGS. 2 and 3, the information is transmitted between the first and second ringing periods as defined in Bellcore Publication TR-TSY-000031, entitled "Class (sm) Feature: Calling Number Delivery," Issue 2, the disclosure of which is expressly incorporated by reference herein in its entirety). This information is received from telephone line 16 by filter/demodulator device 46' and demodulated. Filter/demodulator device 46' demodulates the information so that it passes data in appropriate format to character generator 40 via buffer 44 and processor 42. Character generator 40, in response to timing and data arrangement instructions from processor 42, generates characters (i.e., standard letters and numbers) in accordance with the data received from filter/demodulator device 46', and sends those characters to video processing device 38 via video process input 39b.

Video processing device 38 combines this information with the demodulated video signal which is present at the output of video demodulator 35. A composite video signal is present at the output of video processing device 38 that contains textual and icon information which may comprise the type of call, number of calls, and the identifying telephone number of the calling party. This composite (combined) video signal, output by video processing device 38 at output 39c, is input to NTSC modulator 50 which modulates the video signal by combining it with audio and sync information needed to produce an RF output that is compatible with standard televisions and VCRs (i.e., an NTSC format final composite video signal). The final composite video signal is then placed onto a standard VHF channel 3 or 4 by NTSC modulator 50, in accordance with the selected channel or carrier frequency selected by channel select switch 52. Thus, the final composite video signal is provided to video output jack 74, which may be connected to any NTSC compatible device for transfer of the information to a medium of expression.

In operation of the transfer device, during processing of message waiting information, message waiting detector 56 detects a condition representative of a message waiting or voice messaging status which is signalled on telephone line 16. Such a condition may comprise, e.g., a stuttering of the voltage present on telephone line 16. However, the condition detected may be of another form depending on the switch used by the local exchange carrier. In response to such detection of a message waiting condition, message waiting detector 56 sends a signal, indicating a message waiting status on telephone line 16, to processor 42, which instructs character generator device 40 to accordingly generate an appropriately chosen character or icon message to be sent to an NTSC compatible device such as a television, which is connected to transfer device output 11 via jack 74 (to be displayed on a screen). As previously described, video processor 38 combines the character message with a video signal output by video demodulator 35, and inputs the combined signal to NTSC modulator 50, which converts the signal into an appropriate final composite video signal to be sent to an NTSC compatible device.

Character generator device 40 may comprise any well known picture-in-picture or character display integrated circuit which may be purchased on the market. For example, NEC supplies a CMOS LSI for 2 line×12 column character display on an NTSC screen: Two types of standard LSI are provided: the μPDC-001 and μPDG-101. Additionally, NEC also supplies a CMOS LSI for 2 line×16 column character display on an NTSC screen. Two versions of this LSI are the μPD6143C-001 and μPD6143G-101.

The transfer device of the present invention is capable of operation as a "cable-ready" receiver, and provides users with first and second channel selection devices. The first channel selection device comprises a manual control key pad 28 which may display channel numbers representing the number of a channel being selected. Numbers selected on manual control key pad 28 are used to adjust the RF tuning of the tuner/receiver device 26, thus allowing selection of a predetermined filter present in tuner device 26 to choose the appropriate channel. Such television tuner and receiver performance characteristics and requirements are well known to those in the art, and may be acquired through use of commercially available receivers. A list of known receivers may be found in column 2 of U.S. Pat. No. 4,405,946, which is expressly incorporated by reference herein in its entirety.

Additionally, a second channel changing device may comprise an infrared remote control device 30, 30c. Remote control transmitter 30c sends signalling data, via the infrared spectrum, to remote tuner control device 30. The signalling device received by remote tuner control device 30 is used to select an appropriate filter in the tuner device which corresponds to the desired television channel. An infrared remote control transmitter 30c may also be configured to provide volume control capabilities.

Tuner 26 may comprise a plurality of band pass filters, whereby the center frequency of one or more of the band pass filters may be varied. A switching device, which in the embodiment of FIGS. 2 and 3 comprises tuner controls 28, 30 (30a and 30b), and 30c, is provided to allow selection between each of the band pass filters.

The transfer device may be configured to provide caller ID or message waiting information on a television screen if connected to an ISDN line. To achieve this operation, the telephone line interface 48 and filter demodulator device 46 would be replaced by an ISDN telephone line interface device, and a D channel filter/demodulator device capable of obtaining caller ID information provided by the ISDN architecture's D channel. Once this D channel caller ID information is obtained and passed to the character generator device 40, via buffer 44 and processor 42, the transfer device will operate exactly as previously described with reference to FIGS. 2 and 3.

Figure 4:
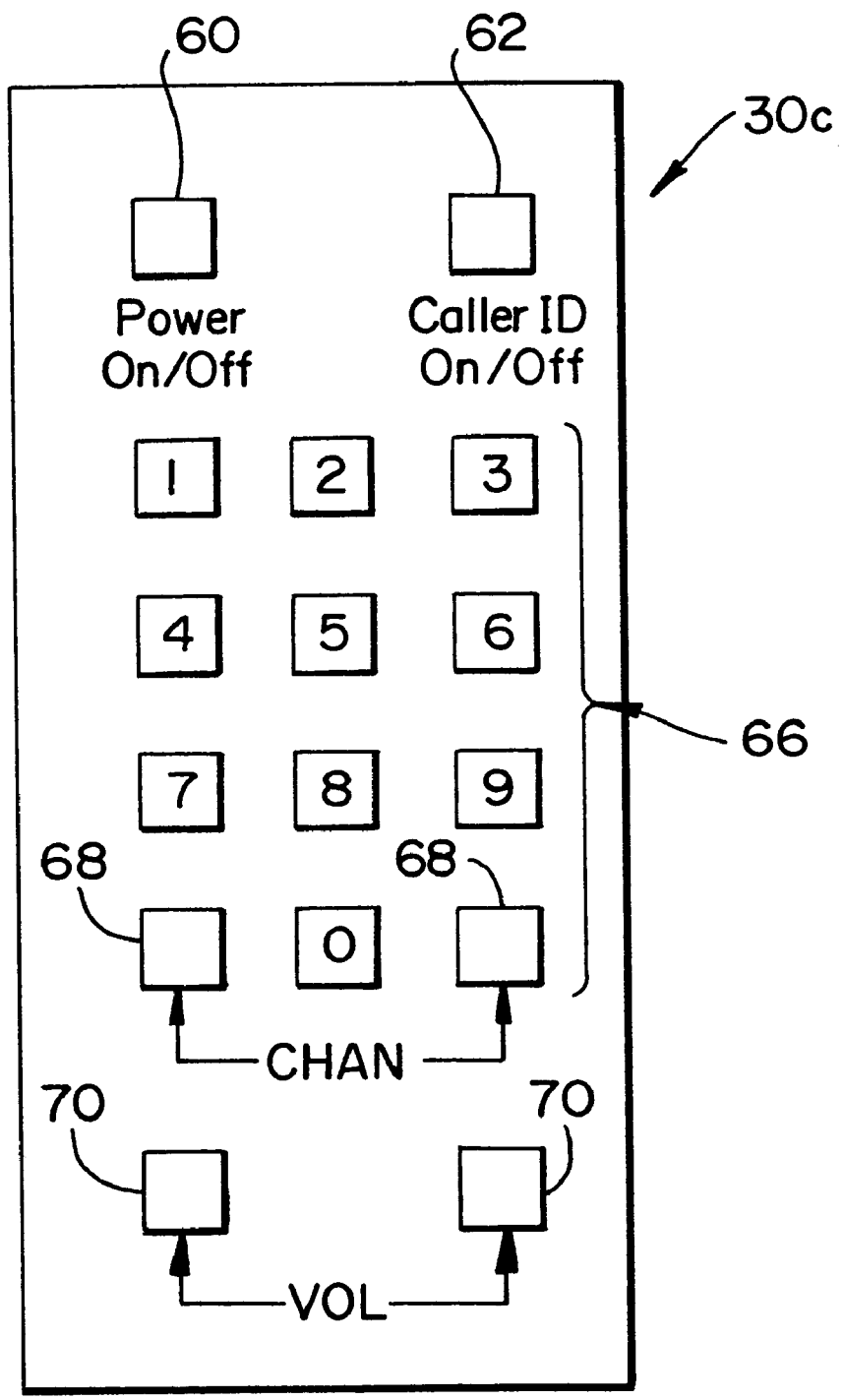
FIG. 4 illustrates a particular embodiment of one remote control device which can be used with the transfer device of the present invention.

FIG. 4 shows infrared remote control transmitter 30c according to the embodiment shown in FIG. 3 of the transfer device of the present invention. As shown in FIG. 4, infrared remote control transmitter 30c may be provided with a number of features, including a switch 60 for turning the transfer device on and off, a caller ID on/off switch 62 which may control the supply of power to the caller ID generation components of the transfer device, such as character generator device 40, processor 42, buffer 44, message waiting detector 56, filter/demodulator device 46', and telephone interface 48'. A numerical key pad 66 is provided on infrared remote control transmitter 30c, and additionally channel increase and decrease buttons 68,68, along with volume increase and decrease buttons 70,70, may be provided to control decrementation and incrementation of the channel number (corresponding to certain defined filters selected in the tuner device) and volume level (i.e., the level of the final composite video signal output by the transfer device).

Various components and elements of the embodiments shown in FIGS. 2 and 3 of the transfer device of the present invention have been pointed out along with the function thereof. As to the specific implementations of certain elements, implementations of these elements is within the skill of the ordinary artisan. Many of these elements employed may be implemented with use of commercially available components and/or are described in previous patents or publications which would enable one of ordinary skill in the art to construct such components. For example, apparatus for tuning and demodulating the composite video signal source 18 (including portions corresponding to tuner 26, manual tuner control 28, remote tuner control components 30 (30a, 30b) and 30c, and demodulator 35) may be implemented in the form of a commercially available television receiver. Tuning and demodulating apparatus along with other components depicted in the embodiments of FIGS. 2 and 3, such as a sync separator, a combining circuit, a character generator, and an NTSC or RF modulator, are discussed in U.S. Pat. No. 4,405,946 which is incorporated by reference herein in its entirety. For example, with reference to character generator 40, it is stated at col 3, lines 60–61, in U.S. Pat. No. 4,405,946 that a satisfactory embodiment of a character generator and combiner is described in U.S. Pat. No. 3,984,828. It is additionally noted in U.S. Pat. No. 4,405,946 that an MM58146 integrated circuit, formerly known to be commercially available from National Semiconductor Corporation, Santa Clara, Calif. comprises an on-screen channel (and time) character generator suitable for use as a character generator (i.e., device 40).

Additionally, referring to processor 42, storage buffer 44, caller ID decoder 46, and interface 48 (all depicted in FIG. 2), and character generator 40, filter/demodulator device 46', telephone interface 48', and modular telephone jack 54 (all depicted in FIG. 3), U.S. Pat. No. 4,924,496 issued to FIGA et al. discloses example configurations and implementations of similar or equivalent elements in greater detail in conjunction with an automatic incoming telephone call originating number and party display system. U.S. Pat. No. 4,924,496 is thus also expressly incorporated by reference herein in its entirety.

Referring to FIG. 3 of U.S. Pat. No. 4,924,496, a telephone interface circuit 72 is disclosed which includes a filter and demodulation circuit 80, a ring interface circuit 78, a modular telephone jack 74, and a universal synchronous receiver/transmitter (UART) 84.

A specific structure which would allow one of ordinary skill in the art to implement each of these elements is discussed therein.

Figure 5:
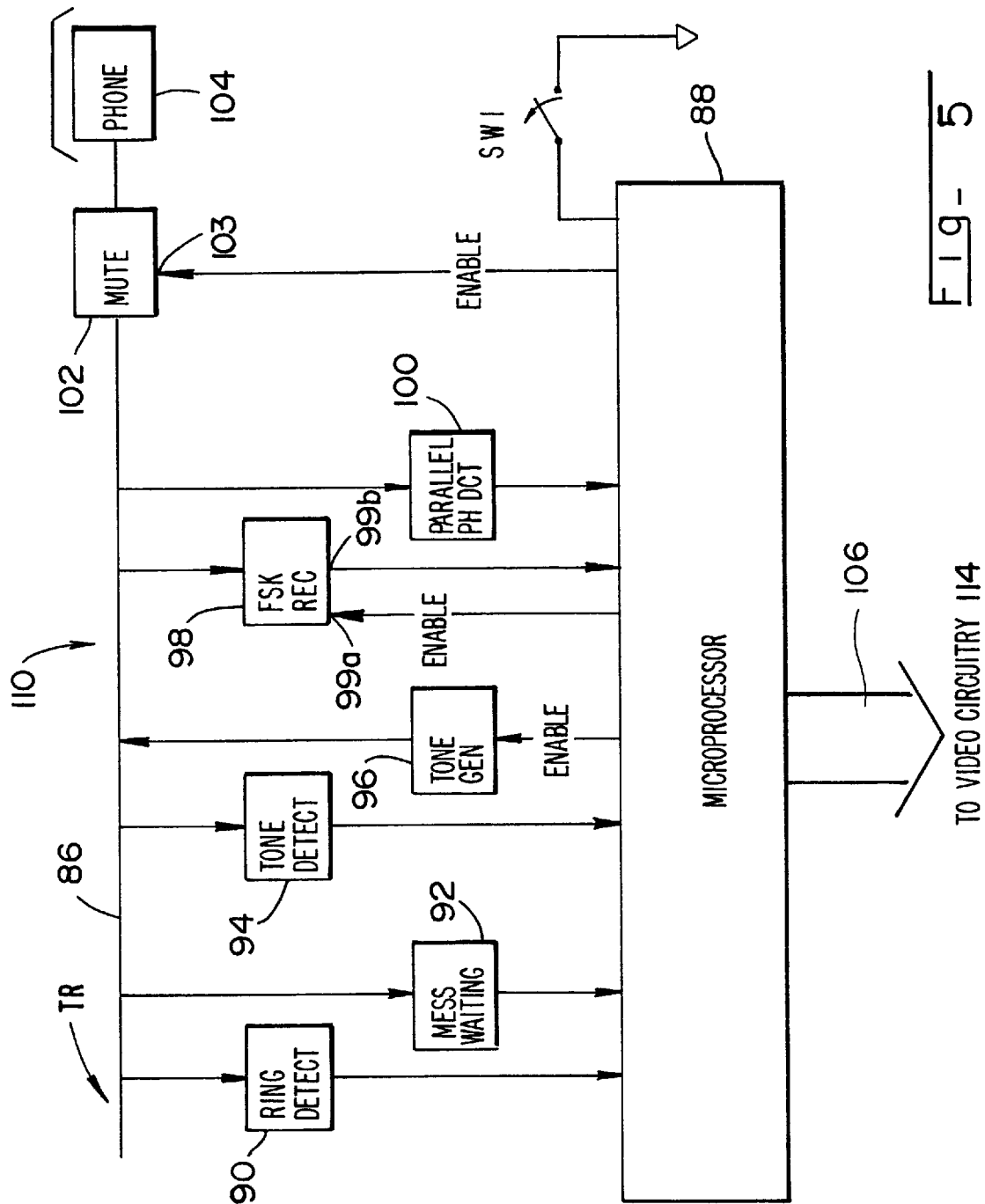
FIG. 5 illustrates a particular embodiment of information processing circuitry which can be used with the transfer device of the present invention.

FIG. 5 illustrates information processing circuitry 110 which can be used in conjunction with the transfer device of the present invention. A microprocessor 88 is connected to video circuitry 114 via a bus 106. The video circuitry may include, for example, an image generator, such as character generator 40 (see FIGS. 2 and 3), and various signal processing elements connected thereto, such as video combiner 38. Accordingly, by making such a connection, information processing circuitry 110, which is shown in FIG. 5, may be incorporated into either of the embodiments of the transfer device as shown in FIGS. 2 and 3 of the present invention.

A ring detect circuit 90 is connected between incoming telephone line 86 and an input of microprocessor 88. In addition, a message waiting detector 92 is connected between telephone line 86 and an input of microprocessor 88. Similarly, a tone detector 94 and a parallel phone detector 100 are each connected between telephone line 86 and respective inputs of microprocessor 88. A tone generator 96 is connected to telephone line 86, and includes an input which is connected to an output enable line of microprocessor 88. An FSK (Frequency Shift Keying) receiver 98 is also coupled to telephone line 86, and comprises both an enabling terminal 99a and an output terminal 99b, both of which are connected to microprocessor 88. A mode setting switch SW1 is connected to an input of microprocessor 88.

A mute device 102 is connected in series between a phone 104 and telephone line 86. Mute device 102 includes an enabling terminal 103 which is connected to microprocessor 88.

Various devices (e.g., 90, 92, 94, and 100) monitor assorted activities on the Tip and Ring (TR) of telephone line 86, and under stored program control, microprocessor 88 interprets these monitored activities, and performs one or more necessary actions via enabling devices such as tone generator 96, FSK receiver 98, and mute device 102.

Figure 6:
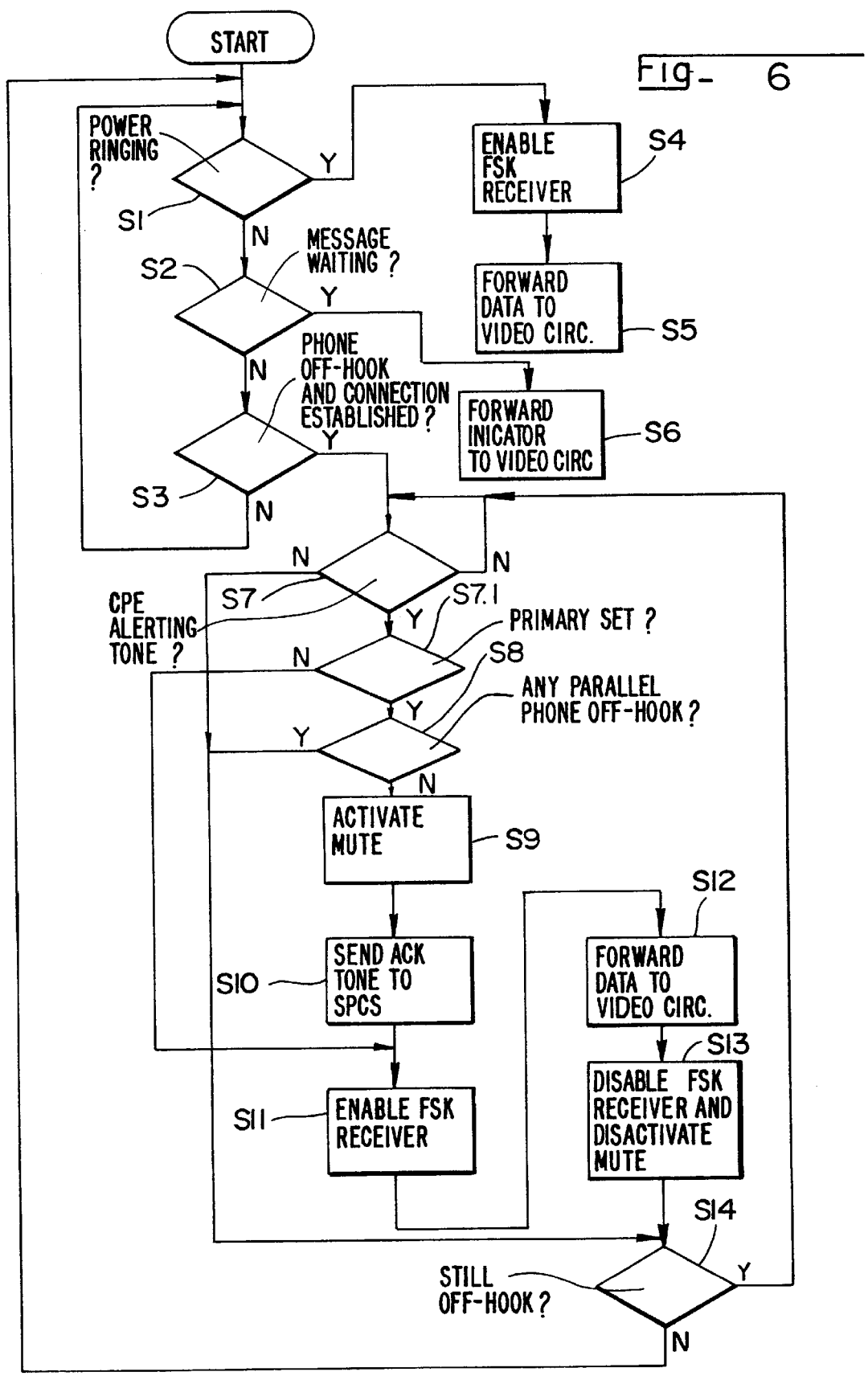
FIG. 6 illustrates a flow diagram which represents the operation of various components of the information processing circuitry of FIG. 5.

A flow diagram shown in FIG. 6 illustrates the operation of the various devices shown in FIG. 5, as controlled by microprocessor 88 under stored program control. In order to provide on-hook Calling Identity Delivery (CID), information processing circuitry 110 must detect the presence of a power ringing on TR. Accordingly, at step S1, a determination is made as to whether or not power ringing exists on incoming telephone line 86. Once ringing is detected, as determined at step S1, the microprocessor will enable FSK receiver 98 to begin receiving data which is embedded between the first and second ring cycles on telephone line 86. This data is then forwarded in step S5 to the appropriate video circuitry for subsequent processing and conversion to a medium of expression, such as characters on a television screen. Generic specifications for CID signalling formats, timing and so on, between an SPCS (Stored Program- Controlled switching System), and a CID device which interprets signals received from the SPCS are described in Bellcore documents TR-TSY-000031 and TA-NWT-000030, each of which is expressly incorporated herein in its entirety.

At step S2, microprocessor 88 enables message waiting device 92 (FIG. 5) to detect whether or not a signal is present on incoming telephone line 86, which indicates the presence of a stored message in a remote message center. If the signal is present on the telephone line, microprocessor 88 proceeds to step S6, where the appropriate message waiting indicator or data is forwarded to video circuitry 114. Video circuitry 114 will accordingly process the indicator or data, and may, for example, display a predetermined message or signal which indicates the presence of a message in the remote messaging center.

If no message waiting signal is present on the telephone line, as determined at step S2, microprocessor 88 will proceed to step S3, where a determination is made as to whether phone 104 is in an off-hook condition, and a connection is established between a caller and a receiver (for example, in a stable two party conversation). Upon detection of such an off-hook condition at step S3, a further determination is made at step S7, as to whether a Customer Premises Equipment (CPE) alerting tone is present on incoming telephone line 86.

A CPE alerting tone will typically follow an audible tone which is sent to an ear piece of telephone 104 in response to a Calling Identity Delivery on Call Waiting condition being activated on telephone line 86. Subsequent to sending this audible tone, the SPCS will then transmit a Customer Premises Equipment (CPE) alerting tone to the telephone line 86 which will be detected by information processing circuitry 110 via tone detector 94 (FIG. 5). Tone detector 94 will receive this signal and accordingly alert microprocessor 88, which will then proceed from step S7 to S7.1.

If CPE alerting tone is detected as determined at step S7, microprocessor 88 will proceed to step S14. If telephone (FIG. 5) remains off-hook, step S7 will be repeated. If telephone 104 is on-hook at step S14, microprocessor will return to step S1.

In step S7.1, microprocessor 88 determines if the device has been set in a primary call waiting receiver mode (i.e., if switch SW1 is closed). If so, microprocessor 88 proceeds to step S8. If the primary mode is not set, microprocessor 88 will jump to step S11.

In step S8, microprocessor 88 will determine, via parallel phone detector 100, whether any parallel phones are connected to telephone line 86, in an off-hook condition. Upon detection that parallel phones, which are in an off-hook condition, are connected to telephone line 86, microprocessor 88 will proceed to step S14 to determine if telephone 104 (FIG. 5) remains off-hook. If so, step S7 will be repeated.

As shown in step S8, microprocessor 88 is programmed to wait (and not continue with a detection and transfer of data with the SPCS to thus perform a Caller Identity Delivery with Call Waiting function) until all parallel phones which are in an off-hook condition have been placed in an on-hook condition. This is to prevent any unwanted interference which may be provided via the parallel telephones, and in addition prevent the generation of data tones in the ear pieces of the one or more parallel telephones.

When microprocessor 88 determines in step S8 that no off-hook parallel phones are connected to telephone line 86 (by receipt of the appropriate signal from parallel phone detector 100), microprocessor 88 will continue to step S9, and activate mute device 102 via enable terminal 103.

When activated, mute device 102 temporarily disconnects the telephone line 86 from telephone 104, and simulates an off-hook condition on telephone line 86, so that the SPCS does not detect an on-hook condition. Upon activation of mute device 102 in step S9, in step S10, microprocessor 88 enables tone generator 96 to send an acknowledgement (ACK) tone to the SPCS.

In step S11, microprocessor 88 enables FSK receiver 98, via enable terminal 99a, to receive the calling identity information from telephone line 86, which will be passed to microprocessor 88 via output terminal 99b. In step S12, microprocessor 88 accordingly forwards the data received in step S11 to video circuitry 114 (not shown). Subsequent to receiving and forwarding the data to video circuitry 114, i.e., once data transmission is complete, in step S13, microprocessor 88 disables FSK receiver 98, and deactivates mute device 102 (if necessary).

In step S14, microprocessor 88 determines whether telephone 104 remains in an off-hook condition. If not, the process is returned to step S1. If the telephone is still in an off-hook condition, thus being capable of receiving further Calling Identity on Call Waiting information, the process is returned to step S7, where microprocessor 88 will await a CPE alerting tone.

The transfer device of the present invention, in the embodiment illustrated in FIG. 5, has two modes of operation: a primary call waiting receiver mode, and a secondary call waiting receiver mode. In the primary receiver mode, which is set by switch SW1 (when in the closed position) and determined by microprocessor 88 at step S7, microprocessor 88 performs steps S8–10. When in the secondary receiver mode, microprocessor 88 foregoes execution of steps S8–10, and skips to step S10 to enable the FSK receiver. The secondary receiver mode is provided in the event a primary call waiting receiver (comprising, e.g., a peripheral/external device) is connected to telephone line 86, which will perform the functions of muting the telephone line 86 and generating an acknowledgement "ACK" tone. In the secondary receiver mode, the transfer device of the present invention is configured (by switch SW1—when in the open position) as a secondary receiver, and will not check for parallel phones, mute the telephone line or generate an acknowledgement (ACK) tone.

It is noted that generic specifications relating to CIDCW (Calling Identity Delivery on Call Waiting) signalling formats, timing, ACK tones, and so on, between the SPCS and a receiving device are discussed in Bellcore documents TA-NWT-000575 and TA-NWT-000030, each of which is expressly incorporated herein in its entirety.

In view of the above, it is noted that in order to obtain information concerning the identity of a source of a call waiting party (Calling Identity Delivery on Call Waiting CIDCW), as described in Bellcore TA-NWT-000575, at least a portion of information processing circuit 110, e.g., mute device 102, will have to be placed in series with a customer's existing telephone set 104. Such a series connection needs to be made in order to prevent a customer who is listening on telephone 104 from hearing data tones via a handset ear piece, and further to prevent the customer's voice from modulating, and perhaps corrupting, the data tones associated with CIDCW information transfer. Accordingly, in the embodiment depicted in FIG. 5, a mute device 102 is provided which temporarily disconnects telephone set 104 from telephone line 86 in order to effect a CIDCW information transfer. Simultaneously, while temporarily disconnecting telephone line 86 from telephone set 104, mute device 102 simulates an off-hook condition on telephone lines 86, by drawing the appropriate level of current from the central office which is connected to telephone lines 86. Thereafter, when the mute device is disabled, relay 80 (see FIG. 7) is returned to its normal position, and telephone 104 is reconnected to telephone line 86. For simplicity in construction and assembly, an entire unitary transfer device 10 (see, e.g., FIG. 1), embodying the information processing circuit 110 of FIG. 5, may be connected between telephone line 86 and telephone 104.

Figure 7:
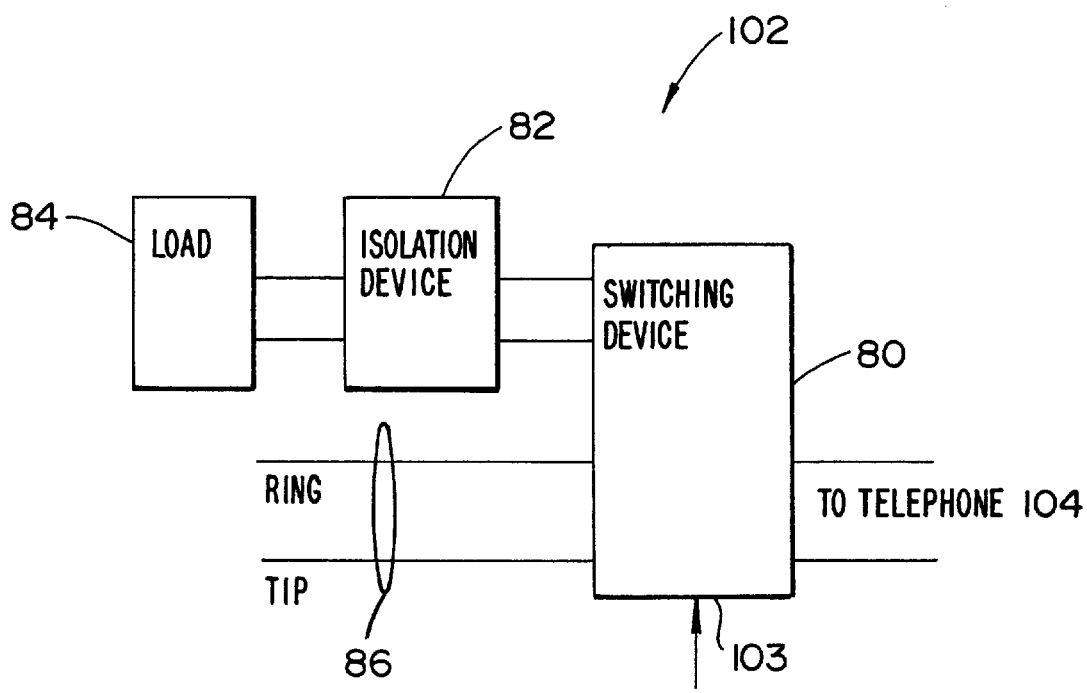
FIG. 7 illustrates a particular implementation of a mute device to be used in the information processing circuitry shown in FIG. 5.

As an illustrative non-limiting example, FIG. 7 depicts a particular embodiment for implementing the mute device 102 in the information processing circuitry shown in FIG. 5. Alternative circuits, which may be, e.g., commercially available, or readily constructed by one of ordinary skill in the art, may be utilized to implement mute device 102. In the embodiment shown, a double-pole, double-throw relay 80 is placed between the Ring and Tip of telephone line 86 and telephone 104. A primary coil of a transformer 82 is connected to the normally open terminals of relay 80, and the Ring and Tip, respectively, of telephone line 86 are connected to the normally closed terminals of relay 80. A resistor 84 is connected across the terminals of a secondary coil of transformer 82.

Resistor 84 may include, for example, a 600 Ω load, depending on the impedance needed to give the appropriate balance load to the secondary coil. The primary coil of transformer 82 will preferably have the appropriate DC resistance so as to draw the needed current which would serve to simulate an off-hook condition of a telephone connected to telephone line 86 and thus "fool" the central office.

Relay 80 must successfully reconfigure the connection between telephone line 86 and telephone 104 within a predetermined time period, such as that defined in LSSGR (LATA Switching Systems Generic Requirements), Section 6.3.5.2, Bellcore document FR-NWT-000064, which is expressly incorporated by reference herein. If the reconfiguration (which includes switching of relay 80 from the normally closed to the normally open position, thus temporarily disconnecting telephone 104 from telephone line 86) is not completed within this time period, the relay's switching activities may be viewed by the central office as a switchhook flash which will cause the SPCS to place the current caller on "hold" and connect a third source (i.e., the call requesting party) directly to telephone line 86.

It is noted that telephone 104 is connected to the normally closed position of relay 80, while the respective terminals of the primary coil of transformer 82 are connected to normally open terminals of relay 80. Such configuration will allow the relay 80 to maintain a connection between telephone line 86 and telephone 104 when no power is applied. Thus, in the event that power is somehow removed from the information processing circuitry 110 (e.g., due to a dead battery or an AC power failure), mute circuit 102 will not impede the normal operation of the customer's telephone set 104.

While the invention has been described with reference to preferred embodiments, it is understood that the words that have been used herein are words of description, rather than words of limitation. Changes may be made within the purview of the appended claims, without departing from the scope and spirit of the invention in its aspects. Although the invention has been described here in reference to particular means, materials, and embodiments, it is understood that the invention is not to be limited to the particulars disclosed herein, and that the invention extends to all equivalent structures, methods and uses such as are within the scope of the appended claims. For example, although various terms have been referred to herein (e.g., Calling Identity Delivery, Calling Identity Delivery on Call Waiting, and Message Waiting) which may describe features which are specific to one or more certain Telephone Systems Providers, they are intended to herein encompass all similar or functionally equivalent features provided by other Telephone Systems Providers, or such features yet to be provided.

What is claimed is:

1. An apparatus for transferring caller information to a television for display on a screen of said television, said apparatus comprising:

a detector which is adapted to detect the presence of a communication present on an incoming tele-communication line;

a decoder which is adapted to decode information present on the tele-communication line to produce caller information related to the communication;

a converter which is adapted to convert said caller information to a television signal suitable for display on said screen of said television;

a communication link, which establishes a communication path between a caller and a receiver, wherein said detector detects the presence of a communication request present on said incoming tele-communication line which is originating from a third source separate from the caller and receiver, said third source comprising a telephone, said caller information including information relating to the origin of the third source;

a disconnect switch which is adapted to temporarily disconnect said tele-communication line from said receiver;

a simulator which is adapted to simulate an off-hook condition on said tele-communication line; and a line receiver which is adapted to receive said caller information from said tele-communication line.

2. An apparatus according to claim 1, further comprising:

an off-hook detector which is adapted to determine whether additional phones are connected to said tele-communication line in an off-hook condition; and a controller which is adapted to control said simulator and said line receiver to be operative only when said off-hook detector determines that no additional phones are connected to said tele-communication line in an off-hook condition.

3. An apparatus according to claim 1, wherein said disconnect switch comprises:

a relay having both a normal position, in which said relay maintains a connection between said caller and said receiver, and a reconfigure position, in which said relay has reconfigured the connection between said tele-communication line and said receiver; and a simulating load, connected to said tele-communication line when said relay is in said reconfigure position, for simulating an off-hook condition of said receiver.

4. An apparatus according to claim 1, further comprising a disable switch which is adapted to disable said disconnect switch and said simulator.

* * * * *